United States Patent Office 3,502,721
Patented Mar. 24, 1970

3,502,721
SELECTED POLYFLUORINATED HYDRAZONES AND HYDRAZINOHYDRAZONES
Carl G. Krespan, Wilmington, Del., assignor to E. I. du Pont de Nemours and Company, Wilmington, Del., a corporation of Delaware
No Drawing. Filed Aug. 18, 1966, Ser. No. 573,178
Int. Cl. C07c *109/12*
U.S. Cl. 260—566
5 Claims

ABSTRACT OF THE DISCLOSURE

Described and claimed are selected polyfluorinated hydrazones, e.g., 1,1,1,4,4,4-hexafluoro-2-butanone hydrazone, and hydrazinohydrazones, e.g., 1,1,1,4,4,4-hexafluoro-3-hydrazino-2-butanone hydrazone. The compounds are prepared by reacting a hydrazine with a perhaloalkene or perhaloalkyne or tetrakis(trifluoromethyl)allene, and are useful polymerization inhibitors, or stabilizers, for polymerizable, ethylenic monomers.

FIELD OF THE INVENTION

This invention relates to new polyfluorinated nitrogen compounds and to a process for preparing them.

DESCRIPTION OF THE INVENTION

The compounds of this invention are polyfluorinated hydrazones and hydrazinohydrazones and have one of the formulas:

(1)

and (2)
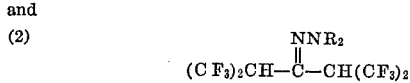

wherein each of $R_f$ and $R'_f$ is lower perfluoroalkyl or lower ω-chloroperfluoroalkyl; the R's are both hydrogen or both lower alkyl; and R' is hydrogen or a hydrazine group, —NHNR$_2$.

These compounds are obtained by reacting a hydrazine of formula $NH_2NR_2$, wherein the R's are both hydrogen or both lower alkyl, i.e., hydrazine itself or a 1,1-dialkylhydrazine, with an internally unsaturated polyfluoroperhalohydrocarbon having one of the formulas:

(I)     $R_f$—CX=CX—$R'_f$ wherein $R_f$ and $R'_f$ are as above and the X's separately are fluorine or chlorine and together are an additional bond between the two multiply-bonded carbons, this reactant therefore being either a polyfluoroperhaloalkene or a polyfluoroperhaloalkyne; and (II)     $(CF_3)_2C=C=C(CF_3)_2$ i.e., tetrakis(trifluoromethyl)allene.

In all cases, the reaction is conducted at a temperature in the range of —80° C. to +100° C., and with a mole ratio of the hydrazine reactant to the perhalohydrocarbon reactant of at least 1:1.

The compounds of Formula 1 where R' is a hydrazino group —NHNR$_2$ are obtained from a perhaloalkene of formula $R_f$—CX=CXR'$_f$, where the X's are F or Cl, in accordance with the equation:

(A)     $R_f CX=CXR'_f + 4NH_2NR_2 \longrightarrow$

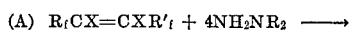 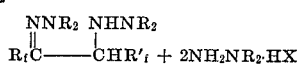

When the perhaloalkene is unsymmetrical, i.e., when $R_f$ and $R'_f$ are different, a mixture of the isomers

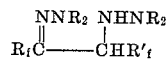

and

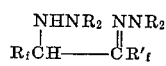

is generally formed. These mixtures can be separated into their components by methods such as gas-phase chromatography but, for most of the applications in which these products may be used, such a separation is unnecessary.

In the process represented by Equation A, it is not essential to use the theoretical reactant ratio, but it is preferred to use at least that ratio, and an excess of hydrazine reactant, e.g., up to a 6:1 molar ratio or higher, can be used if desired. This excess serves to neutralize the hydrogen halide formed, although this can be done also by conducting the reaction in the presence of an inert hydrogen halide absorber such as pyridine, triethylamine, sodium cyanide, or the like. The reaction is moderately exothermic, and the preferred reaction temperature lies within the range of —40 to +50° C.

The compounds of Formula 1 where R' is hydrogen are obtained from a perhaloalkyne of formula $$R_f—C\equiv C—R'_f$$

in accordance with the equation (B)     $R_f C\equiv CR'_f + NH_2NR_2 \longrightarrow$ 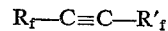

Here again, when the perhaloalkyne is unsymmetrical, a mixture of the two possible position isomers is generally formed. For maximum utilization of the perhaloalkyne reactant, the hydrazine reactant is used in a molar ratio of approximately 1:1, although higher ratios can be used if desired. The reactant is exothermic and usually requires cooling, at least at the start. The preferred reaction temperature is within the range of —60 to +50° C.

The compounds of Formula 2 are prepared by reacting tetrakis(trifluoromethyl)allene with the appropriate hydrazine in accordance with the equation (C)     $(CF_3)_2C=C=C(CF_3)_2 + NH_2NR_2 \longrightarrow$

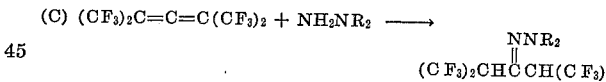

The molar ratio of the hydrazine reactant to the allene reactant is approximately 1:1 or higher, and the preferred reaction temperature is in the range of —30 to +50° C.

In all of the above-described reactions the pressure is immaterial, as the reaction can be conducted at atmospheric, or even subatmospheric, pressure or in sealed vessels either at the autogenous pressure developed by the reaction components at the operating temperature or under additional applied pressure, e.g., up to 1000 atmospheres or more.

A solvent or reaction medium is not essential. However, in order to promote contact between the reactants, it is preferred to conduct the reaction in an inert solvent containing no active hydrogen (i.e., hydrogen attached to an atom other than carbon). Suitable solvents include ethers such as diethyl ether, di-n-butyl ether, 1,2-dimethoxyethane, tetrahydrofuran, or dioxane; aromatic hydrocarbons or halohydrocarbons such as benzene, toluene, the xylenes or chlorobenzene; nitriles such as acetonitrile or benzonitrile; tertiary amines such as pyridine or triethylamine; and the like.

The reaction products can be separated from the reaction mixture by any suitable conventional method such as fractional distillation under ordinary or reduced pressure, or crystallization when they are solids.

The internally unsaturated polyfluoroperhaloalkenes which are used to prepare the hydrazinohydrazones of Formula 1 are known compounds. Some of them are listed in Lovelace et al., "Aliphatic Fluorine Compounds," Reinhold Publishing Corp., 1958, pp. 117–121. Other members of this class have been reported in the journal literature and in U.S. Patents 2,918,501; 2,925,446; 3,000,-979; in French Patent 1,357,391; and still others can be prepared by the methods described in these publications.

The internally unsaturated polyfluoroperhaloalkynes used to prepare the hydrazones of Formula 1 are also known. A number of them are described in U.S. Patents 2,546,997; 2,996,527; and 3,052,691.

Tetrakis(trifluoromethyl)allene is prepared by treatment of bis(trifluoromethyl)ketene at 0 to 100° C. with a nucleophilic catalyst such as a tetraalkylammonium halide. Bis(trifluoromethyl)ketene has been reported by Knunyants et al. in Izvest. Akad. Nauk. U.S.S.R. 1963, 1389–1397 and 1570–1576. A typical preparation of tetrakis(trifluoromethyl)allene is as follows:

A glass reactor is charged with 770 g. of bis(trifluoromethyl)ketene, 20 g. of tetraethylammonium chloride and 134 g. of methylene chloride, cooled in a bath of liquid nitrogen and sealed. It is warmed to about 25° C. and agitated gently at that temperature for about 16 hours. It is then cooled to −80° C. and the reaction mixture is transferred to a still pot and distilled. After removal of unreacted ketene (310 g.) and a foreshot (54 g.), there is obtained 122 g. of tetrakis(trifluoromethyl)allene in the form of a colorless liquid, B.P. 41° C. It absorbs at $4.95\mu$ in the infrared.

*Analysis.*—Calcd. for $C_7H_{12}$ (percent): C, 26.95; F, 73.08. Found (percent): C, 27.08; F, 73.32.

The following examples illustrate the invention in greater detail.

EXAMPLE 1

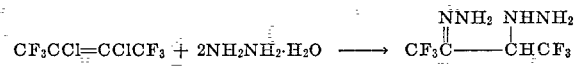

$$CF_3CCl=CClCF_3 + 2NH_2NH_2 \cdot H_2O \longrightarrow CF_3\overset{NNH_2}{\underset{\parallel}{C}}-\overset{NHNH_2}{\underset{|}{C}}HCF_3$$

The product obtained in this and the two following examples, 1,1,1,4,4,4-hexafluoro-3-hydrazino-2-butanone hydrazone, exists in two isomeric forms of different melting points and distinguishable from one another by spectral analysis. These two forms will be referred to as the low melting and the high melting isomers.

A mixture was prepared of 58.2 g. (0.25 mole) of 2,3-dichlorohexafluoro-2-butene, 25 g. (0.50 mole) of hydrazine hydrate, 50 ml. of acetonitrile and 12.3 g. (0.25 mole) of sodium cyanide (the latter was added in the expectation that a different reaction from that actually observed might take place; it also served to neutralize the hydrogen chloride formed). This mixture was stirred under nitrogen and held at 0–5° C. for 1.5 hours, then at room temperature for two additional hours. The organic upper layer was decanted and the aqueous lower layer was extracted with 20 ml. of acetonitrile. The organic layers were combined and evaporated at 0° C. and 10 mm. pressure in a rotating evaporator to remove solvent and volatile by-products. Rough distillation gave a fraction boiling at 70–80° C. (2 mm.) which crystallized to afford 17.4 g. of the hydrazone as a white solid, M.P. 51–53° C. This material was dissolved in methylene chloride and the less soluble high melting isomer was removed by filtration. The filtrate was evaporated to a low volume and petroleum ether was added until cloudiness persisted. The mixture was filtered again and cooled to 0° C. The precipitate of low melting isomer was isolated by filtration and further purified by sublimation at 45° C. (1 mm.). There was obtained 12.1 g. of the low melting isomer of 1,1,1,4,4,4-hexafluoro-3-hydrazino-2-butanone hydrazone as colorless crystals, M.P. 52–53° C. This was resublimed before analysis.

*Analysis.*—Calcd. for $C_4H_6F_6N_4$ (percent): C, 21.43; H, 2.70; F, 50.86; N, 25.00. Mol. wt., 224. Found (percent): C, 21.90; H, 2.88; F, 50.78; N, 25.69. Mol. wt., 222 (f.p. benzene).

The infrared spectrum (KBr wafer) showed absorption bands at 3.00 and $3.05\mu$ (N—H), $3.45\mu$ (saturated CH), $6.05–6.25\mu$ (broad $NH_2$ and C=N), and $8–9\mu$ (C—F). The nuclear magnetic resonance spectrum also supported the assigned structure.

EXAMPLE 2

The product of Example 1 (low melting isomer) was prepared from the same perhaloalkene but under somewhat different conditions.

A mixture of 32 g. (1.0 mole) of anhydrous hydrazine and 100 ml. of acetonitrile was stirred and cooled at 0° C. while 58 g. (0.25 mole) of 2,3-dichlorohexafluoro-2-butene was added dropwise over a 30-minute period. The mixture was stirred an additional 0.5 hour, during which time it was allowed to warm spontaneously to 34° C. It was then filtered and the solid filter cake was rinsed with acetonitrile. Evaporation of the solvent from the combined filtrate and washings followed by distillation in a short path still afforded 26 g. of the crude hydrazone (low melting isomer), B.P. about 80° C. (0.5 mm.). Redistillation in a molecular still under 0.5 mm. pressure with the pot at 90° C. gave 23.8 g. (42% yield) of hydrazone as a distillate which solidified to a white solid, M.P. 51–53° C. This product was shown by infrared and nuclear magnetic resonance analysis to be identical with that of Example 1.

EXAMPLE 3

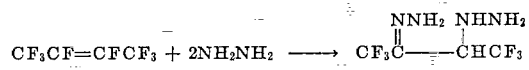

$$CF_3CF=CFCF_3 + 2NH_2NH_2 \longrightarrow CF_3\overset{NNH_2}{\underset{\parallel}{C}}-\overset{NHNH_2}{\underset{|}{C}}HCF_3$$

Octafluoro-2-butene (50 g., 0.25 mole, 28 ml. at −80° C.) was evaporated over a period of 30 minutes into a stirred mixture of 32 g. (1.0 mole) of anhydrous hydrazine and 200 ml. of ether in a flask cooled to 0° C. and topped with a −80° C. reflux condenser. The resulting yellow reaction mixture was stirred an additional 30 minutes at 0° C. and allowed to warm slowly to 25° C. to distill off the unreacted octafluoro-2-butene (2.5 ml.). The mixture was then filtered and the filter cake was rinsed with three 50 ml. portions of ether. The combined filtrate and washings were evaporated under reduced pressure to give a residual oil from which crystals deposited. The crystalline solid was separated by filtration, rinsed with ether, then with water, and dried to give 4.1 g. of the high melting isomer of 1,1,1,4,4,4-hexafluoro-3-hydrazino-2-butanone hydrazone, M.P. 123–125° C. The filtrate gave, on distillation, a small amount of the low melting isomer which volatilized and solidified as feathery white needles, M.P. 54–55° C. The residue from this distillation was extracted with ether, then with benzene, to provide a second crop of the high melting isomer (0.8 g.). The two crops of high melting isomer were combined and recrystallized from benzene/ether to give 3.5 g. of 1,1,1,4,4,4-hexafluoro-3-hydrazino-2-butanone hydrazone, M.P. 124–125° C.

*Analysis.*—Calcd. for $C_4H_6F_6N_4$ (percent): C, 21.43; H, 2.70; F, 50.86; N, 25.00. Found (percent): C, 22.10; H, 2.88; F, 50.94; N, 24.86.

The infrared spectrum (KBr wafer) showed absorption bands at 3.00 and $3.15\mu$ (NH, $NH_2$), $3.35\mu$ (saturated CH), $5.89\mu$ (C=N), 6.17 and $6.25\mu$ ($NH_2$), and $8–9\mu$ (C—F). The nuclear magnetic resonance spectrum also confirmed the structure. The mass spectrum confirmed a molecular weight of 224 and gave a high proportion of the fragments $CF_3CH(NHNH_2)^+$ and $CF_3C=NNH_2^+$ from cleavage of the central bond. The mass spectrum of the low melting isomer similarly gave a molecular weight of 224 and major amounts of the fragments $CF_3CH(NHNH_2)^+$ and $CF_3C=NNH_2^+$.

By applying the procedures described in Examples 1–3 to different starting materials, other $\alpha,\beta$-hydrazino hydrazones of this invention are obtained. Examples of such reaction products are those having the formulas:

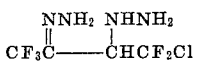

from hydrazine and 2,4-dichloroperfluoro-2-butene;

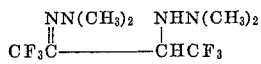

from 1,1-dimethylhydrazine and octafluoro-2-butene;

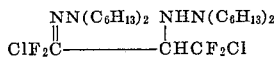

from 1,1-di(n-hexyl)-hydrazine and 1,4-dichloroperfluorobutene;

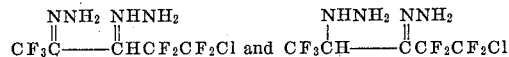

from hydrazine and 2,3-dichloroperfluoro-2-pentene;

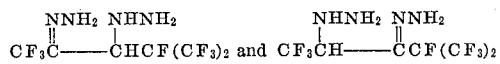

from hydrazine and perfluoro-4-methyl-2-pentene;

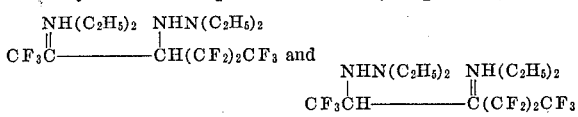

from 1,1-diethylhydrazine and perfluoro-2-hexene;

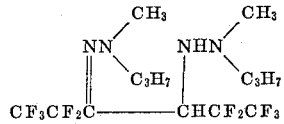

from 1-methyl-1-propylhydrazine and perfluoro-3-hexene;

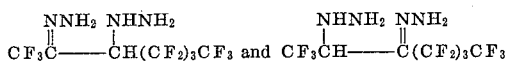

from hydrazine and perfluoro-2-heptene;

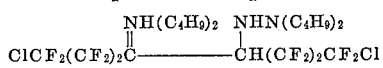

from 1,1-dibutylhydrazine and 1,8-dichloroperfluoro-4-octene;

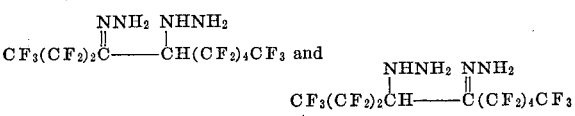

from hydrazine and perfluoro-4-decene;

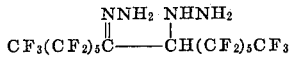

from hydrazine and perfluoro-7-tetradecene.

EXAMPLE 4

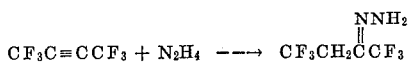

Hexafluorobutyne (65 g., 0.4 mole) was condensed in a flask containing 100 ml. of ether cooled to —60° C. and 19.2 g. (0.6 mole) of anhydrous hydrazine was added dropwise with stirring, after which an additional 32 g. (0.2 mole) of hexafluorobutyne was distilled into the flask. The exothermic reaction was controlled by maintaining the mixture at a temperature of —60° C. After it had subsided, the stirred mixture was allowed to warm to room temperature, then distilled. There was obtained 95.3 g. (82% yield) of 1,1,1,4,4,4-hexafluoro-2-butanone hydrazone, B.P. 71° C. (60 mm.), $N_D^{28}$ 1.3534.

*Analysis.*—Calcd. for $C_4H_4F_6N_2$ (percent): C, 24.75; H, 2.08; F, 58.73; N, 14.44. Mol. wt., 194. Found (percent): C, 24.78; H, 2.08; F, 58.17; N, 14.52. Mol. wt., 194 (mass spec.).

The infrared spectrum in carbon tetrachloride showed bands at 2.87, 2.97, and 3.08μ (NH, NH₂), 3.30 and 3.36μ (saturated CH), 6.05μ (shoulder, C=N), 6.15μ (NH₂), and 7–9μ (C—F). The nuclear magnetic resonance spectrum supported the assigned structure.

In the same manner, other hydrazones of this invention are obtained from other bis(polyfluoroperhaloalkyl) acetylenes and/or other hydrazines. Examples of such reaction products are those having the formulas:

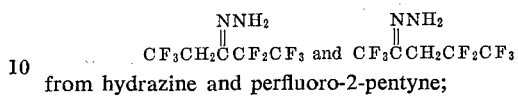

from hydrazine and perfluoro-2-pentyne;

from 1,1-di(isobutyl)-hydrazine and perfluoro-3-hexyne;

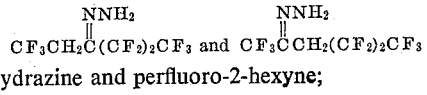

from hydrazine and perfluoro-2-hexyne;

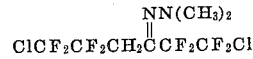

from 1,1-dimethylhydrazine and 1,6-dichloroperfluoro 3-hexyne;

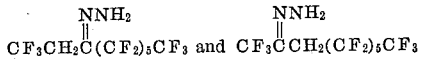

from hydrazine and perfluoro-2-nonyne;

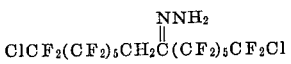

from hydrazine and 1,1,4-dichloroperfluoro-7-tetradecyne.

EXAMPLE 5

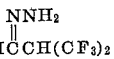

To a stirred solution of 1.6 g. (0.05 mole) of hydrazine in 25 ml. of ether cooled to 0–5° C. was added dropwise over a 30-minute period 15.6 g. (0.05 mole) of tetrakis (trifluoromethyl)allene. The volatile materials were then removed from the reaction mixture by distillation and the reaction product was sublimed from the residue at 25° C. and 1 mm. pressure. There was thus obtained 1.2 g. of 2,4-bis(trifluoromethyl)-1,1,1,5,5,5 - hexafluoro - 3 - pentanone hydrazone, M.P. 41–42° C.

*Analysis.*—Calcd. for $C_7H_4F_{12}N_2$ (percent): C, 24.43; H, 1.17; F, 66.26; N, 8.14. Mol. wt., 344. Found (percent): C, 24.57; H, 1.35; F, 66.57; N, 7.95. Mol. wt., 344 (mass spec.).

The infrared spectrum (Nujol mull) showed absorption bands at 2.89, 2.97, and 3.05μ (NH₂), 6.03μ (C=N), 6.17μ (NH₂) and 8–9μ (C—F). The nuclear magnetic resonance spectrum supported the assigned structure.

Other hydrazones of this invention are obtained by substituting 1,1-dialkylhydrazines for hydrazine in the above procedure. Examples of such reaction products are those having the formulas:

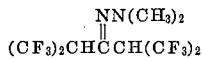

from 1,1-dimethylhydrazine;

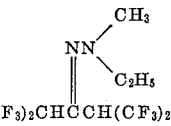

from 1-methyl-1-ethylhydrazine;

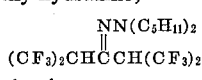

from 1,1-diamylhydrazine.

The fluorinated hydrazones of this invention are useful as polymerization inhibitors, i.e., as stabilizers, for polymerizable ethylenic monomers. This utility is shown by the following tests of inhibition of the free radical-induced polymerization of a typical polymerizable monomer, methyl methacrylate.

Test solutions were prepared from 1 ml. of distilled, uninhibited methyl methacrylate (MMA) and 0.1 ml. of representative compounds of this invention. To each of the resulting homogeneous solutions was added the same catalytic amount of the powerful free radical-producing polymerization initiator azobis(isobutyronitrile). As the control, the same amount of the same initiator was added to MMA (without any fluorinated nitrogen compound), and a blank of pure MMA, without initiator or stabilizer, was also tested. All test samples were heated in stoppered test tubes under an atmosphere of air on the steam bath for 2 hours. At the end of this time the tubes were cooled and 0.6 ml. portions of the samples were withdrawn into a 1.0 ml. pipette. The time required for 0.2 ml. of the liquid to drain out of the pipette was taken as a measure of relative viscosity and hence of the amount of polymerization. The results are shown in the table below.

| Sample composition | Time to drain, 0.2 ml. |
| --- | --- |
| Blank (pure MMA) | 12 sec. |
| Control (MMA plus initiator) | 3 min., 55 sec. |
| MMA plus initiator plus $CF_3CH_2\overset{\overset{NNH_2}{\|\|}}{C}CF_3$ | 3 sec. |
| MMA plus initiator plus $CF_3\overset{\overset{NHNH_2}{\|}}{C}\text{---}\overset{\overset{NNH_2}{\|\|}}{C}CF_3$ | 2 sec. |

These results show that the compounds of this invention are effective free radical inhibitors and thus are able to serve as polymerization stabilizers for polymerizable monomers.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the formula

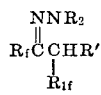

wherein each of $R_f$ and $R'_f$ is lower perfluoroalkyl or lower ω-chloroperfluoroalkyl; the R's are both hydrogen or both lower alkyl; and R' is a hydrazino group of the formula

—NHNR$_2$ wherein the R's have the same significance as above.

2. 1,1,1,4,4,4-hexafluoro-3-hydrazino-2 - butanone hydrazone.

3. The isomer of claim 2 which melts at 124 to 125° C.

4. The isomer of claim 2 which melts at 124 to 125° C.

5. Process for preparing the hydrazino-hydrazones of the formula of claim 1 which comprises reacting a perhaloalkene of the formula $R_fCX=CXR^1_f$ in which $R_f$ and $R^1_f$ are lower perfluoroalkyl or lower ω-chloroperfluoroalkyl and the X's are F or Cl, with a hydrazine of the formula

NH$_2$NR$_2$ in which the R's are both hydrogen or both lower alkyl, at a temperature of from −40° to +50° C.

References Cited

UNITED STATES PATENTS 3,226,439  12/1965  Middleton ........... 260—566

OTHER REFERENCES

Buchner, Berichte, vol. 22, pp. 2929–32 (1889).
Carboni et al., J.A.C.S., vol. 80, pp. 5793–95 (1958).

LEON ZITVER, Primary Examiner

GERALD A. SCHWARTZ, Assistant Examiner

U.S. Cl. X.R.

260—486

PO-1050
(5/69)

UNITED STATES PATENT OFFICE
CERTIFICATE OF CORRECTION

Patent No. 3,502,721  Dated March 24, 1970

Inventor(s) Carl. G. Krespan

It is certified that error appears in the above-identified patent and that said Letters Patent are hereby corrected as shown below:

Column 1, line 43, "hydrazine" should be

- hydrazino -

Claim 3, "124 to 125°C." should be

- 51 to 53°C. -

SIGNED AND
SEALED
SEP 29 1970

(SEAL)
Attest:

Edward M. Fletcher, Jr.
Attesting Officer

WILLIAM E. SCHUYLER, JR.
Commissioner of Patents